(12) United States Patent
Schaefer

(10) Patent No.: US 10,545,026 B1
(45) Date of Patent: Jan. 28, 2020

(54) SYSTEM AND METHOD FOR TRACKING THE POSITION OF A PERSON AND PROVIDING NAVIGATION ASSISTANCE

(71) Applicant: Philip Raymond Schaefer, Weaverville, NC (US)

(72) Inventor: Philip Raymond Schaefer, Weaverville, NC (US)

( * ) Notice: Subject to any disclaimer, the term of this patent is extended or adjusted under 35 U.S.C. 154(b) by 0 days.

(21) Appl. No.: 15/997,552

(22) Filed: Jun. 4, 2018

Related U.S. Application Data

(60) Provisional application No. 62/515,164, filed on Jun. 5, 2017.

(51) Int. Cl.
*G01C 21/34* (2006.01)
*G01C 21/36* (2006.01)

(52) U.S. Cl.
CPC ....... *G01C 21/3476* (2013.01); *G01C 21/343* (2013.01); *G01C 21/3484* (2013.01); *G01C 21/3617* (2013.01)

(58) Field of Classification Search
CPC .............. G01C 21/3476; G01C 21/343; G01C 21/3484; G01C 21/3617
USPC ......................................................... 701/426
See application file for complete search history.

(56) References Cited

U.S. PATENT DOCUMENTS

| | | | |
|---|---|---|---|
| 9,326,103 B2 | 4/2016 | Shen et al. | |
| 9,476,724 B2 | 10/2016 | Caine | |
| 9,568,587 B2 | 2/2017 | Faragher et al. | |
| 9,671,238 B2 | 6/2017 | Hoogland | |
| 9,746,327 B2 | 8/2017 | Hakim et al. | |
| 9,797,732 B2 | 10/2017 | Li et al. | |
| 9,829,335 B2 | 11/2017 | Chang et al. | |
| 9,857,187 B2 | 1/2018 | Profous et al. | |
| 9,880,008 B2 | 1/2018 | Vvei | |
| 2010/0125409 A1* | 5/2010 | Prehofer | G01C 21/206 701/408 |
| 2010/0268454 A1 | 10/2010 | Fountain | |
| 2015/0073708 A1* | 3/2015 | Mishra | G01C 21/00 701/533 |
| 2017/0258666 A1* | 9/2017 | Kim | G01C 21/3641 |

OTHER PUBLICATIONS

Barr, Avron and Edward Feigenbaum, The Handbook of Artificial Intelligence, 1981, pp. 64-73, vol. 1, William Kaufmann, Inc., Los Altos, California, USA.

* cited by examiner

*Primary Examiner* — Marthe Y Marc-Coleman

(57) ABSTRACT

A method provides navigation assistance to a user by tracking the user's position. By detecting similar features, the accuracy of the position measurement of the user is improved, making use of a priori frequencies that various feature types exist in the area. The method provides techniques for planning a route using the tracking information and is able to explore previously-untraveled paths in response to a setting in the search process. The navigation information can be saved or retrieved from a database so that users may share the data obtained during navigating an unfamiliar area.

17 Claims, 8 Drawing Sheets

SYSTEM AND METHOD FOR TRACKING THE POSITION OF A PERSON AND PROVIDING NAVIGATION ASSISTANCE

CROSS-REFERENCE TO RELATED APPLICATIONS

This patent application claims the benefit of U.S. Provisional Application No. 62/515,164 filed Jun. 5, 2017.

GOVERNMENT LICENSE RIGHTS

This invention was made with United States government support under one or more SBIR grants from the National Institute of Disability, Independent Living, and Rehabilitation Research (NIDILRR). The United States government has certain rights in this invention.

FIELD OF INVENTION

This invention relates generally to sensing the position of a person position and guiding them toward a destination and, more particularly, to a device that uses the data from a position to create data structures describing the possible paths to travel and guiding the person to a destination by using these data structures.

BACKGROUND OF THE INVENTION

The present invention provides a way for people, particularly persons with visual disabilities, to be able to navigate in indoor spaces, particularly spaces that do not have GPS coverage and places where no detailed maps have been created. Such an invention is needed because confusion, being lost, and losing track of one's orientation within large or unfamiliar indoor spaces are some of the biggest challenges facing people with blindness and low vision. Various techniques for remembering directions and locations can be learned to minimize these issues, but people who cannot readily access visual information are still at a significant disadvantage, even for getting around in places where sighted individuals can navigate visually. Many blind individuals avoid venturing into unfamiliar territory unless absolutely necessary. Thus, persons with visual disabilities are often deprived of many everyday life opportunities available to people without such disabilities.

Since GPS typically doesn't work indoors and isn't fine-grained enough for the purpose, other technology for indoor wayfinding has recently been introduced, taking advantage of ubiquitous smartphone capabilities. Most notably, WiFi- and Bluetooth beacon systems have been developed for the consumer market to enable navigation in large indoor spaces (for example, airports) and to find products in retail chain stores. Several groups are working on adaptations for users with visual disabilities. However, there are a number of costly disadvantages of this technology that undermine its potential for general, everyday use:

Indoor spaces must be mapped out in detail to create an electronic map for the navigation app to use. Databases must be also be created to allow a conversion of received beacon signal strengths to locations on the map.

For Bluetooth- or tag-based navigation products, the building must also be outfitted with customized beacon or electronic tag hardware.

Although private entities may one day invest in these mapping and hardware-installation tasks for the fraction of large buildings and facilities where the demand for such services is great among people without disabilities, it is unlikely to be undertaken for smaller venues such as restaurants, schools, medical offices, and private residences, where non-visually-impaired people do not require such technology.

Most traditional route planning systems assume the existence of an accurate map that represents the possible routes that can be taken by the user, for example, in a conventional GPS navigation system, the user's position is provided by GPS measurements and a map containing roads, highways, and addresses is used for generating the route. Most route planning systems use a search technique based on some kind of cost function, in which route segments are added to potential route plans, the relative desirability of each determined by a cost function. The well-known A* (pronounced "A star" algorithm (see Barr, Avron, and Edward Feigenbaum, "The Handbook of Artificial Intelligence, Vol. 1", William Kaufmann, Inc., 1981, pp. 64-73) or one of its variants is typically used to efficiently find a route solution with the best or close-to-best cost. The cost function may simply be the expected time to complete the travel, the distance of the route, or a combination of such factors. Costs associated with distance and fuel usage can be applied to choose the most effective route for the user. Other techniques are described to choose the most effective route, such as U.S. Pat. No. 9,476,724 to Caine et al, which discloses the use of familiarity scores that describe the familiarity or popularity of route segments, and weighting the generation of a plan accordingly. Another technique is shown in U.S. Pat. No. 9,857,187 to Profous et al, which discloses the use of a reachability metric to guide the search.

Some systems provide techniques for going beyond the boundaries of roads, for example U.S. Pat. No. 9,671,238 to Hoogland discloses a system that can generate routes that transition from terrestrial roads to non-road travel, such as water or air travel, and back. However, such approaches still require the use of predefined maps or map-like structures that show the connectivity between the various points that can be navigated during travel from the starting point to the destination.

The above prior art, however, does not address problems associated with incomplete maps or maps with high uncertainties in the location of the route elements, such as hypothesizing a possible route segment to follow between two route segments, or the possibility that two points represented on a map might actually be the same point in reality if uncertainties in the map position data are taken into account.

There are inventions, however, that address the more extreme case that no map data at all is available. In such cases, previous systems have used the process of traveling between waypoints or following breadcrumbs. For example, U.S. Pat. No. 9,829,335 to Chang et al discloses a virtual breadcrumb approach for indoor navigation. A position sensor measures the position of the user and stores the position for later recall. A series of waypoints with a distance-related value, such as steps and direction taken is stored with each. After traveling the path, the user can then command the system to guide him or her back along the waypoints to the starting point, using various sensor techniques to assure proper path following. This approach is good for following a specific path backwards or forwards, but does not correct for inefficiencies in the stored path. For example, if the user becomes slightly lost and wanders through an area that was not necessary for reaching the goal, the breadcrumbs would guide the person to follow the unnecessary as well as necessary parts of that path when returning to the starting point. Chang et al also does not disclose provisions for sharing parts of multiple paths taken at different previous points, which would be helpful for navigating in a complex environment. U.S. Patent Application US 2010/0268454 by Fountain discloses waypoint navigation in an unconstrained three-dimensional space, such as in underwater or wilderness environments, but similarly does not address the issues related to finding an optimal path given complex or overlapping recorded paths. The prior art also does not address the problems of uncertainties in both user position and path position that cause various ambiguities in the exact direction the user should turn, and can therefore yield very confusing navigation instructions if the user is not at the center of the probability region calculated by the system.

In the conventional GPS navigation scenario, the position of the user is known to a relatively high accuracy relative to the accuracy of the associated outdoor navigation maps. For example, a GPS location may be known to 15 feet or better, whereas the distances between roads is typically a much greater distance, so in typical vehicular navigation problems, the accuracy in user position is not a major problem. However, when GPS signals are not available, or for indoor navigation where much higher accuracy may be required, uncertainties in the user position become important and may even be larger in magnitude than some of the distances being traversed. Because of this, certain aspects of the uncertainty in user position have been addressed in the prior art.

U.S. Pat. No. 9,880,008 to Wei discloses the use of a distance sensor and a map of the interior of a building to correct for the errors in using a dead-reckoning inertial position sensor. The distance to walls in the building is matched with the known map of the building to calculate a more likely position that the user is actually located. However, this approach requires an additional distance sensor and an accurate and detailed map of the building. U.S. Pat. No. 9,797,732 to Li et al discloses the use of a map to improve the error bounds in position estimation. As the user traverses an indoor space, the path is compared to the constraints in the map, such as walls and other non-traversable areas and adjusts the location of the points to cause the path to fall within a physically-possible route. U.S. Pat. No. 9,326,103 to Shen et al discloses the use of magnetic field anomalies in addition to RF signals to obtain characteristic signatures from various parts of an indoor venue, so as to estimate the position of the user. These approaches require an accurate predefined map, which will not be available for many indoor environments.

U.S. Pat. No. 9,746,327 to Hakim et al, discloses a technique that requires less detailed map information, which is to take the user position obtained by dead reckoning, which is subject to drift and other errors, and improve it based on identifying known features or constraints in the environment. A priori known constraints, such as characteristics of the building the user is in, can be combined with features such as stairways, to help localize where the user is located. Hakim et al also discloses using known absolute location information, such as a GPS reading, to propagate positional corrections and thus correct previous positions of a stored path. This prior art also shows techniques for matching encountered features to similar features found earlier, but does not address the problem of uncertainty about whether a particular feature is the same or possibly different example of the same feature type. For example, the stair case example illustrated in Hakim et al is a case where likelihood of finding a second, different staircase nearby is low, but an important case such as doorways is not addressed in the prior art, where it would cause significant errors to assume that a previously-encountered nearby door is surely the doorway in question.

U.S. Pat. No. 9,568,587 to Faragher et al discloses an approach for tracking a person using particle filters. That system updates the position of the person based on inertial measurements, which are then adjusted and improved by radio signal strengths. The user's position can be determined, for example, by a weighted average of the particles in the particle filters, which can also be viewed as a distribution of the possible locations of the user.

OBJECTS AND ADVANTAGES OF THE PRESENT INVENTION

Therefore, several objects and advantages of the present advantage are:
(a) To provide a self-sufficient and standalone indoor navigation device, requiring no infrastructure to be installed in the indoor spaces of interest, thus being applicable to any unfamiliar indoor or outdoor space,
(b) To provide a navigation technology that does not require maps to be created prior to navigating a building,
(c) To provide a navigation technology that can not only follow previous paths, but combine portions of several previous paths for an optimal solution,
(d) To provide a navigation technology that can hypothesize previously-unexplored connectivity between previous paths
(e) To provide a navigation technology that addresses uncertainty both in the user's current position and in the positions of the locations of previous paths
(f) To provide a navigation technology that can correct position based on previously-encountered features, including handling feature types that may occur at frequent intervals in the environment,
(g) To provide a navigation technology that can give instructions for following a plan even with high levels of uncertainty and ambiguity about the relative location and direction of the user relative to the locations of landmarks in the plan.
(h) as a result of the above objects and advantages, to provide a technology that improves upon prior-art navigation systems by providing more accurate information about the position of the user, by providing navigation plans that allow an optimized, controllable degree of exploration of previously-untraversed paths through the environment, and by providing more comprehensible, less-confusing navigation instructions in the presence of uncertainties of measurement.

SUMMARY OF THE INVENTION

The subject invention receives a series of location inputs from a location sensor and records paths being followed by the user, along with associated uncertainties in the location. In one embodiment of the invention, when the user wishes to navigate to a goal position on or near one or more of the recorded paths, the invention searches for an optimal route between the user's current position and the goal position by piecing together parts of existing paths. In another embodiment of the invention, the system also proposes possible connectivity between points in the paths that have not yet been traversed. In another embodiment of the present invention, the user is guided toward the goal point using this path, and the invention tracks their position, taking the uncertainty in the path as well as in the user's current position. In another embodiment of the invention, the path to the destination is dynamically updated in response to the observed path currently being taken by the user.

DESCRIPTION OF THE PREFERRED EMBODIMENTS

In the following paragraphs, the term "user" or "person" is utilized to refer to the entity that is receiving the benefit of the navigation assistance provided by the invention, it will be clear that within the scope of the invention, machines or other devices could alternately receive the information similarly. The present invention could be implemented as an electronic or optical device that performs the sensing and processing functions, or partly or wholly as a software device, if modules that implement the features described below are created. Many of the functions described herein could be implemented on a Personal Computer (PC), smart phone, smart watch, tablet, or other portable or wearable device. Many of the features of the present invention can be implemented as digital hardware, analog hardware, or software instructions, as will be apparent to one of skill in the art.

Figure 1:
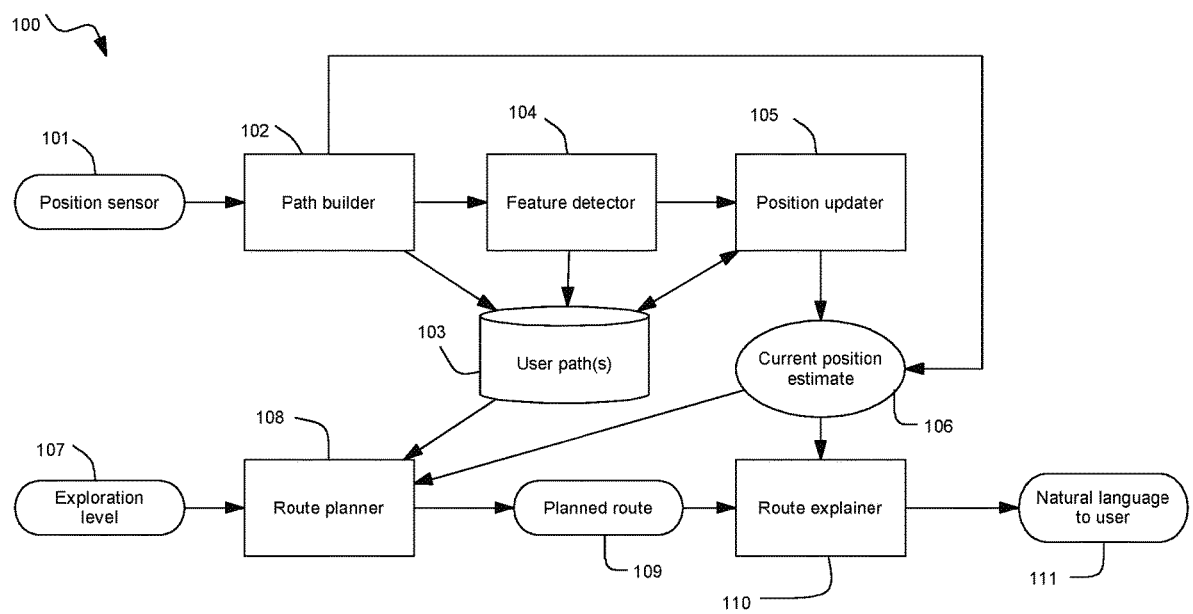
FIG. 1 is a block diagram of a preferred embodiment of a tracking and navigation system 100 of the present invention

FIG. 1 is a block diagram of a preferred embodiment of a tracking and navigation system 100 of the present invention, aspects of which are described in the following paragraphs.

Recording a Continuous Path of Travel

In the preferred embodiment of the present invention, a basic function that supports many of the other functions is that of tracking the user. FIG. 1 is a block diagram of a preferred embodiment of a system for tracking the Position of a Person and Providing Navigation Assistance 100. In the embodiment shown in FIG. 1, Position sensor 101 is a device or configuration of devices that provides input about the absolute or relative position of the user, or provides information about motion of the user that can then be used by the invention to keep track of position. One example of Position sensor 101 is the pedometer-like sensing device of U.S. patent application Ser. No. 15/260,483 by Schaefer, that measures the direction and length of steps taken by a pedestrian user. Other types of position-measuring devices are described above in "Review of tracking and route planning approaches". The tracking function may alternately be performed by any other source of location information, but in any case, the data source provides information used by Path builder 102 to not only update the value of Current position estimate 106, but also create a point-by-point path describing where the user has been, either recently, or preferably, long-term, which is stored in User path(s) 103. In this specification, this tracking information about the user may be referred to as a path or user path, but in each case, preferably contains information about one or more paths followed by the user near the location of interest at one or more visits to that location. The present invention optionally includes sensor input from a wheeled, floating, swimming, or flying contrivance, but for the present purposes, this specification will describe its functionality for use with a walking sensor or pedometer-like device that measures distance and direction, not just counts steps. It will be clear to one of skill in the art how to adapt the discussion of walking-based paths used in this Specification to uses of the invention for other modes of travel.

The path of the user stored in User path(s) 103 is ultimately used for generating routes for the user to follow and guiding the user along these routes, as is described in more detail below. Route planner 108 pieces together parts of the User path(s) 103, preferably including the exploration of likely new path segments according to the setting of Exploration level 107. Exploration level 107 can be an input from a user interface, a setting saved with a user profile, something that increases as the user gains experience, or other technique that will be apparent to one of skill in the art. The resulting Planned route 109 defines a path through space to the destination requested by the user. Route explainer 110 compares the Current position estimate 106 with the Planned route information 109 to create understandable guidance to the user in the form of Natural language to user 111.

Uncertainty of Position

Along with the location or position of the user, the preferred embodiment of the present invention also keeps track of an uncertainty in position of the user. For a position-measuring system based Position sensor 101 that uses triangulation or other absolute position measurement, this typically is a constant distance uncertainty or uncertainty based on the signal quality available to the sensor. For embodiments utilizing a relative-position input device such as a pedometer, the uncertainty will be based at least partly on the distance walked from a known position, with the uncertainty increasing with traveled distance. For example, if the sensor has an inherent uncertainty of 3%, it will accrue 3 feet of uncertainty for every 100 feet traveled. Uncertainty in such a sensor will be based both on the distance traveled, as well as the uncertainty in the direction of travel.

Variance and Sigma

Various uncertainty frameworks may be used with the present invention. One embodiment of the present invention uses the concept of variance for keeping track of positional uncertainty. Given a position in space, the variance approximates the probability distribution of where the user may be as a function of the measured point. The simplest embodiment assumes circular symmetry, although other types of distributions are used in alternate embodiments. The standard deviation, or sigma, defined here as the square root of the variance, is used in this embodiment, since it is convenient to have the uncertainty in the same units as the position. For example, a position, location, or point could be specified as 310 feet east, 51 feet north (of a reference point) with a sigma (uncertainty) of (+/−) 4 feet. Conversion back and forth between variance and sigma is done as appropriate.

Heading

In addition to the position of the user, the heading may be of use in many navigation tasks. Although the heading can be derived from successive position measurements, when the user is stationary, it is helpful to know which direction they are facing, in addition to which direction they are moving. A compass, preferably coupled with an angular rate sensor, is one embodiment of a way of keeping track of the direction the user is moving.

Detecting Features During Path Travel

Feature detector 104 detects various features as the user travels through the environment and stores references to the features along with path information in User paths(s) 103. If these features correspond to fixed points in space or in the venue of interest, they can help to improve the positional accuracy of the system. Examples of feature types in the preferred embodiment of the invention are described below, and are particularly relevant for the case where inertial sensors, such as accelerometers, magnetometers, and angular rate sensors are available. Alternately, other means of detecting features that are known in the art and providing them to an embodiment of the present invention, can be used.

Corners—

When indoors, the instances in which a user makes turns often correspond to corners in the building. The corners in a building may correspond to actual structural corners, such as in a hallway, or to doors, or to other obstacles or objects in the environment, such as shelves or aisles in a store, or tables in a restaurant. In an alternate embodiment of the invention, the user specifies corners, but preferably, corners are detected automatically. The preferred embodiment detects corners automatically by looking for relatively straight sections of travel, then finding where the current relatively-straight section of the path has a significantly different direction than a previous, recent relatively-straight section of travel. A point of inflection, or a pivot or corner point that best depicts the transition between the two directions, is used as the detected corner feature position. One of skill in the art will understand how to define a corner point from such path information.

Elevators and Escalators

In a preferred embodiment of the present invention, an elevator is identified by detected when a substantial vertical acceleration is found when the user is taking relatively few steps. Escalators can be detected when the person steps forward and then a vertical acceleration is noted even though the person is not stepping nearly as much as usually produces that magnitude of vertical acceleration. The top and bottom of the escalator preferably each correspond to a point feature with opposite acceleration effects.

Stairways— stairways are detected in a preferred embodiment of the present invention by noting changes in the vertical acceleration waveform of the pedometer that don't even out in integration, or that are larger or distinctive compared to typical walking waveforms for that user. The top and bottom of the stairway each preferably correspond to a point feature with opposite acceleration effects.

Magnetic Anomalies— magnetic anomalies in general typically relate to a ferromagnetic (for example, iron) object in the vicinity, such as an appliance, a structural beam, etc. Thus, in one embodiment of the present invention, the position of such an anomaly is used as a reference point of a magnetic feature. In one embodiment of the present invention, a magnetic anomaly is detected by the presence of a point in the travel where the angular rate measured by an angular rate sensor is significantly different than the angular rate measured by differentiating the output of a compass, using techniques that will be apparent to one of skill in the art.

Path Crossings—

The points at which the path of the user crosses over previous paths of the user or of another users may correspond to intersections in hallways, sidewalks, etc., and thus are used as feature points in one embodiment of the present invention.

Turnarounds— although not typically as reliable as corners, turnaround points can sometimes correspond to a valid feature in the environment. In a preferred embodiment, they are detected using code similar to the corner detection Java code above, but looking for a larger angle than the approximate right angle used there.

Straightaways—

Straight sections of walking can correspond to hallways or other fixed paths in the environment, and can also be used to help align the recorded path in buildings or other environments that have a regular grid-type layout. In the preferred embodiment of the present invention, straight sections are detected by fitting a line segment to recent points in the path and evaluating the deviation of the points from a perfectly-straight line segment. Other techniques for detecting straightaways from a path that fall within the scope of the present invention will be apparent to those with skill in the art.

Radio Frequency (RF) Transmitters

The presence of RF signals that can be detected by the present invention or a connected device can also be used as features. In one embodiment of the present invention, the signal strength of a WiFi hotspot or Bluetooth beacon defines an approximately circular ring-shaped feature (rather than a point feature) that represents the set of points at an approximate distance from the source. Multiple readings of the same source are used to define the location of the center of the ring, using mathematical techniques apparent to one of skill in the art. The uncertainty of these measurements is derived from the likely amount of signal-strength distortion from an ideal inverse-square relationship that is typical of the type of environment. In the preferred embodiment, a simple percentage, for example, 20% of the apparent free-space distance, is used to approximate the various distortions in strength that are anticipated.

GPS Signals—

In the preferred embodiment, GPS location information is used as a point feature, with the associated GPS measurement uncertainty being used for the feature uncertainty.

User-Identified Features—

In addition to features detected automatically by the system or provided by external sensors, other arbitrary points may be of interest to a user. These features, which may also be called "landmarks", can be represented in one embodiment of the present invention as one or more types of user-identified features. For example, a point along a path could correspond to "Kim's office". Or a point along a route may correspond to "water fountain". Or they may not correspond to a structurally-significant location, such as "place where I stopped to say 'hi'". In this embodiment of the present invention, the user can label points at any time when traveling, such as by using voice-recognition features of a smartphone app. Alternately, features can be identified off-line by methods that will be apparent to one of skill in the art.

Improvement of Position Estimates Based on Encountered Features

Figure 2:
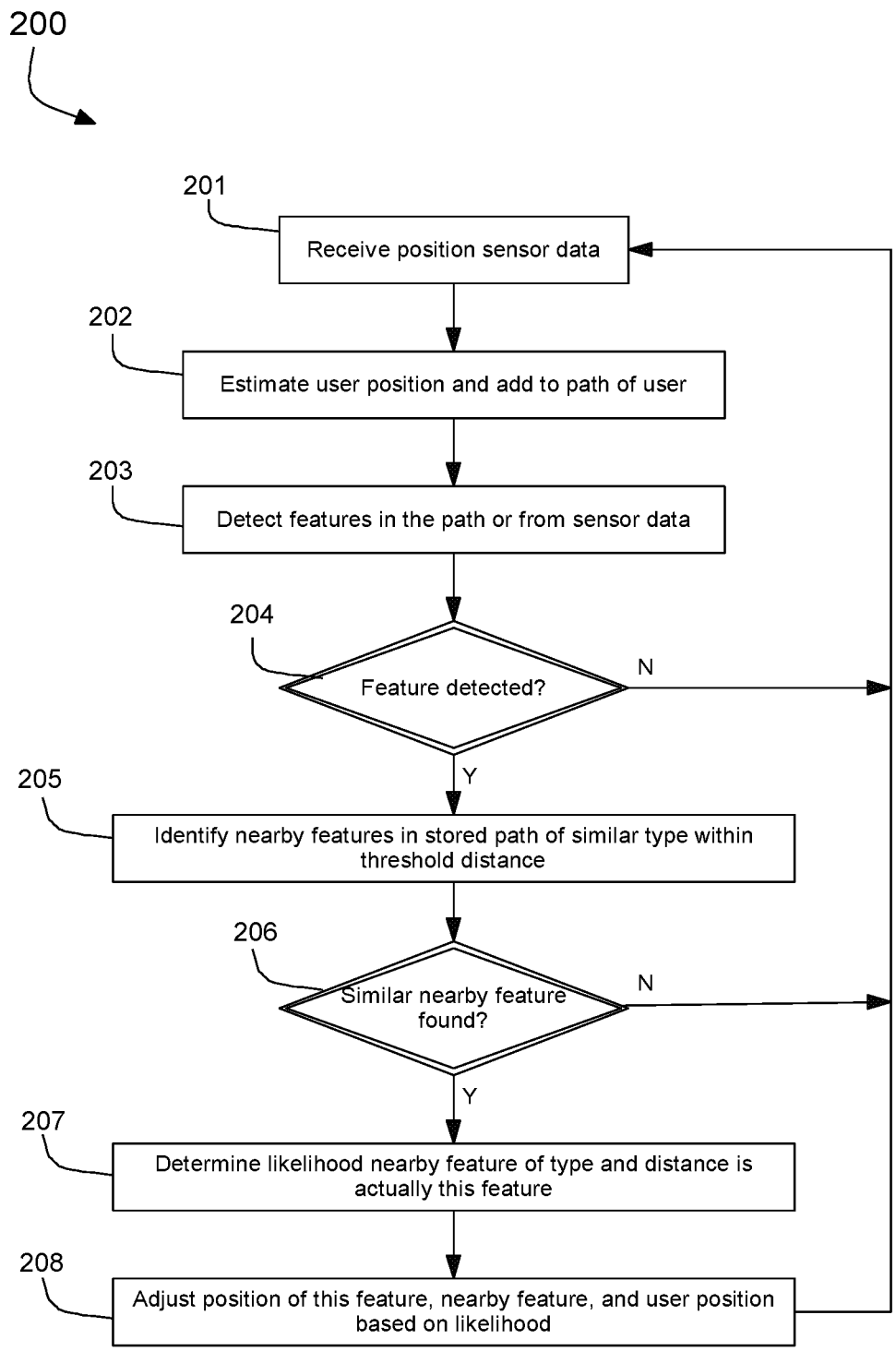
FIG. 2 depicts an exemplary position updating method.

Position updater 105 updates the Current position estimate 106 and one or more positions associated with the trajectory or path followed by the user and/or positions associated with features in User path(s) 103 on the basis of features detected by Feature detector 104. One of the several valuable uses of features is for improving on the accuracy of the position measurement given by the basic position sensor, for example, a pedometer-like walking position sensor. In the preferred embodiment of the present invention, as the user travels, if it is determined that a feature is nearby, the uncertainty in measurement of that feature, combined with the position and uncertainty in the user's current position measurement, is combined to create improved position estimate as follows. FIG. 2 depicts an exemplary Position updating method 200, which is an embodiment of this position improvement as performed by Position updater 105. Conceptually, the process of improving the position is that if a feature is currently detected, and a nearby feature has previously been detected that may in fact be the same feature, the position of the current and/or previous feature are modified to more closely correspond to each other, depending on the likelihood that the current and previous features actually correspond to the same point or set of points in the environment. Unlike the case of a high-accuracy indoor map, the relative accuracy of the user's position might be greater than that of the known feature, so the updating must take both uncertainties into account.

As an update to the user position-related data is received by block 201, Receive position sensor data, this position information is used to update the user position and to add to the user path by block 202, Estimate user position and add to path of user, which in a preferred embodiment of the invention is simply appending the position data, with time stamp, to a list of positions defining the path. Block 203, Detect features in the path or from sensor data, is the process that identifies features in the recent path, or from recent sensor data, as described above and in Feature detector 104. Block 204, Feature Detected?, decides whether such a feature exists, and if so, block 205, Identify nearby features in stored path of similar type within threshold distance, determines whether any of the detected features are close enough and of an equal or similar type. Block 206, Similar nearby feature found?, decides of such a features exists, and if so, block 207, Determine likelihood nearby feature of type and distance is actually this feature, examines the likelihood that such features have the possibility of being used to update positions in the system, and this function is performed, as will be described in the following feature, in block 208, Adjust position of this feature, nearby feature, and user position based on likelihood.

Various frameworks for modifying the estimated position of the user may be used within the scope of the present invention. The basic concept is that a series of potentially-redundant location estimates is combined to produce a new estimated position. The weight of, or extent to which each location's position estimate affects the resultant calculated position increases with the certainty of the position, as well as with the certainty that the location estimate actually corresponds to the position of the feature that is near the user.

In the preferred embodiment of the invention, since each position estimate is associated with a variance in position, the resultant position estimate is a weighted sum of the current position sensor position estimate and position estimates derived from the nearby feature position estimates, where the weight of each estimate is inversely proportional to its variance. Other combination rules that fit within the above concept, such as particle filters, Kalman filters, or other data fusion techniques known in the art, are used in alternate embodiments of the present invention. Techniques for applying these concepts for various feature types are described below.

In the preferred embodiment of the present invention, when the user is determined to be near (in other words, has encountered) a particular feature, all possibly-identical features within some threshold distance that could realistically correspond to the particular feature are collected. For example, if the user is at a corner, all known corners within a threshold distance of the current position are collected. The threshold is preferably based on the uncertainty of the existing features and of the current position. If the uncertainties indicate a potential overlap, the features could potentially represent the same position in the environment.

Next, a new position for the particular feature is computed, based on a weighted combination of all the possibly-identical features. In a preferred embodiment of the invention, combining the variance and the likelihood of relevance results in the following position-weighting Equation (1):

$$\text{New position} = \left(1 / \sum_{j=1}^{F} W(j)\right) \sum_{k=1}^{F} \text{Position}(k) * W(k) \quad (1)$$

with weights $W(i) = \text{Likelihood}(i)/\text{Variance}(i)$ \quad (2)

where F is the number of relevant known features within a distance threshold, Position(k) is the position of the kth feature, Likelihood(i) is the equivalence likelihood that the ith feature actually corresponds to the feature near the user's current position, and Variance(i) is the variance in position of the ith feature.

Finally, the user's current position is moved by a similar amount as is the encountered feature, to correspond to the new positional update.

Since Position(i) is a 2 or 3-dimensional quantity, various vector math operations are implied, which will be apparent to one of skill in the art.

The following paragraphs describe techniques for calculating the Likelihood(i) values of Equation 1. Other uncertainty formulations based on probabilistic techniques known in the art can alternately be used in the present invention, as will be apparent to one of skill in the art.

Improving Position Measurement Based on Point Features.

This section discusses improving features based on a point feature, such as a corner, turnaround, crossing, elevator, stairway, or escalator, or other feature that corresponds to one or more discrete points. Conceptually, the process of improving the position is that if a feature is currently detected, and a similar nearby feature has previously been detected, the position of the current and/or previous feature are modified (for example, brought closer together) to more closely correspond to each other, depending on the likelihood that the current and previous features actually correspond to the same point in the environment. Although many varied techniques may be used to implement this aspect of the current invention, preferred embodiments are illustrated here.

To determine the likelihood that two detected features actually correspond to the same feature in the real-world environment, several factors are preferably used:

(a) The distance between the positions associated with the two features
(b) The similarity of the two features (for example, the angle of corners)
(c) The uncertainty in position of the two features
(d) The expected a priori distance in the environment between a feature and a neighboring, distinct, feature of the same type.

In one simple embodiment of the present invention, the Likelihood algorithm checks each of these four factors, and if they meet some test criterion, for example, a weighted average of all factors, or that each factor met a threshold criterion, the result would be that the position of the encountered feature is "snapped onto" the previous position. However, the preferred embodiment is to move one or more of the features partially toward each other, based on the most likely position, using probabilistic techniques. This helps to avoid errors when two nearby features are similar and nearby, but not actually the same feature.

Given the position and uncertainty of the user's current position and the position and uncertainty of a previously-noted feature, the math to compute an updated or improved current position according to this invention may be any framework in which the respective effects of the feature and of the measurement on the output location value are inverse monotonic with respect to the uncertainty.

A preferred embodiment of this concept is to define the likelihood that two measured features correspond to the same feature in the real world in terms of a quantity $L(i)$, which is defined as the expected distance along any particular path, between a feature of the type i in question (for example, a corner) to the next such feature. In an office building, for example, a reasonable value for $L(i)$ for doorways might be 12 feet. The concept is that the algorithm will calculate whether a feature of a certain type at a certain distance away is likely to be a different feature than the previously-noted feature. As an example, if an upward staircase is detected at a user's position that is only 4 feet away from a known upward staircase, it is highly likely that the user is at that staircase, rather than at a second staircase so nearby, because the L for stairways will be much greater than 4 feet, since the spatial density of upward-going staircases is typically much lower than other types of features, such as corners. This framework for leveraging the differences in the likely spatial density of types of features is one of the innovations of the subject invention.

The likelihood of a feature existing at distance $L(i)$ from the user's current measured position is thus approximately 0.5 in the preferred embodiment of the invention, since at that distance, it becomes more likely than not that a feature exists. If the user is at a position of $2L(i)$ from the feature, an approximation is that the likelihood of the feature corresponding to the user's location is 0.25, since the likelihood of another such feature being closer increases correspondingly.

Making this assumption, one embodiment of the present invention therefore uses a continuous function, for example, the exponential depicted in Equation (3):

$$\text{Likelihood}(i,k) = 2^{-\text{distance}(i,k)/L(i)} \quad (3)$$

where Likelihood(i,k) is the "equivalence likelihood", or the likelihood that nearby feature i is the same as current feature k, $L(i)$ is the value of L (related to spatial density of the feature type i) as defined above for features of the type of feature i, and distance(i,k) is the distance between features i and k.

Alternately, other equivalence likelihood functions that decrease with distance and increase with $L(i)$ are used, for example in Equation (4):

$$\text{Likelihood}(i,k) = 2^{-\text{distance}^2/L(i)^2} \quad (4)$$

where the ^ corresponds to the power-of operator, or alternately, other expressions, for example, geometric expressions instead of exponential, could be used within the scope of the present invention.

In one embodiment of the present invention, values for $L(i)$ are pre-defined manually, based on reasonable expectations of the occurrence of feature types in buildings. These can be further categorized by types of building, or even with respect to particular buildings. In a preferred embodiment of the invention, the occurrence of features of each type is maintained by the system to obtain these statistics over time and over use. In yet another embodiment, if a shared database of maps is created (see section below), a scanning operation goes through all of the stored data and gathers $L(i)$ values automatically, for distribution to the users of the invention.

Improving Position Measurement Based on Aligned Paths

A similar approach to the point-feature approach above is used in the preferred embodiment of the present invention to improve the measured position of the user when traveling on parallel or perpendicular paths. This approach is useful when it has been determined the user is on a straightaway feature, as defined above. The likelihood that a previously-encountered straightaway is parallel to the current straightaway is considered to depend on several factors:
(a) the distance of the previous straightaway from the current straightaway (the closer, the more likely)
(b) the difference in measured angle between the two straightaways (the more nearly equal, the more likely to be parallel in the real world)
(c) an a prior likelihood that the environment contains parallel straightaways. (for example, a grocery store is very likely to be organized with parallel aisles)

In the preferred embodiment of the present invention, a likelihood function similar to the point-likelihood function of Equation (3) is used, for example, see Equation (5):

$$\text{Likelihood}(i,k) = PL_0 (2^{-\text{distance}(i,k)/PL_{max}}) \text{AngleLikelihood}(\text{theta}(i), \text{theta}(k)) \quad (5)$$

where Likelihood(i,k) is the "alignment likelihood" that nearby straightaway feature i is parallel to current straightaway feature k, PLmax represents the maximum reasonable distance at which paths in the environment can be assumed likely to be parallel to each other, $PL_0$ is the a priori probability that the indoor environment in question has parallel paths, theta(i) is the angle in space of straightaway feature i, theta(j) is the angle in space of straightaway feature j, and AngleLikelihood is a function that computes the likelihood that straightaways at the angles of its arguments are actually parallel.

In the preferred embodiment of the invention, AngleLikelihood is simply a threshold, for example, angles within +/−10 degrees of each other produce a value of 1 and a value of 0 otherwise. Alternately, AngleLikelihood is a continuous function, such as an exponential, with a maximum value of 1.0 at an angle difference of 0.

PLmax is preferably a function of the type of venue, perhaps determined from GPS readings and a database of addresses and the type of venue at that address. For example, a number of 1000 feet might be appropriate for a "big box" shopping venue. Or a fixed value across all venues could alternately be used.

PL$_0$ is preferably a function of the type of venue, for example 1.0 for a shopping area. Or a fixed value across all venues for PL$_0$ could alternately be used.

Other formulations for this likelihood function could also be used, such as squaring the distance/PL factor, using a geometric expression instead of the exponential, etc., and will be apparent to one of skill in the art.

In addition to angle differences near zero, the parallel-straightaway concept preferably also includes straightaways that are approximately 180 degrees (the person following the path in reverse), using adaptations to the above that will be apparent to those with skill in the art. Similarly, angle differences near plus or minus 90 degrees are preferably used to adjust paths to be more nearly perpendicular, if they are approximately perpendicular, since in many venues, the possible pathways will tend to be parallel and perpendicular to each other. In this case, the adjustment to the path could be based on making the endpoint of a straightaway more nearly perpendicular.

For straightaway position adjustments, in the preferred embodiment, the current straightaway is adjusted to be more nearly parallel to the previous straightaway. In this case, in the weighting operation described above, instead of using an actual point on the previous straightaway and moving the point toward the previous straightaway, a point that is on a line from the beginning of the current straightaway and defining a line segment that is parallel to the previous straightaway is used. In an alternate embodiment, both the beginning and the endpoints of the current straightaway are modified to be more parallel to the previous straightaway, for example by drawing a parallel line through the center of the current straightaway.

Figure 5:
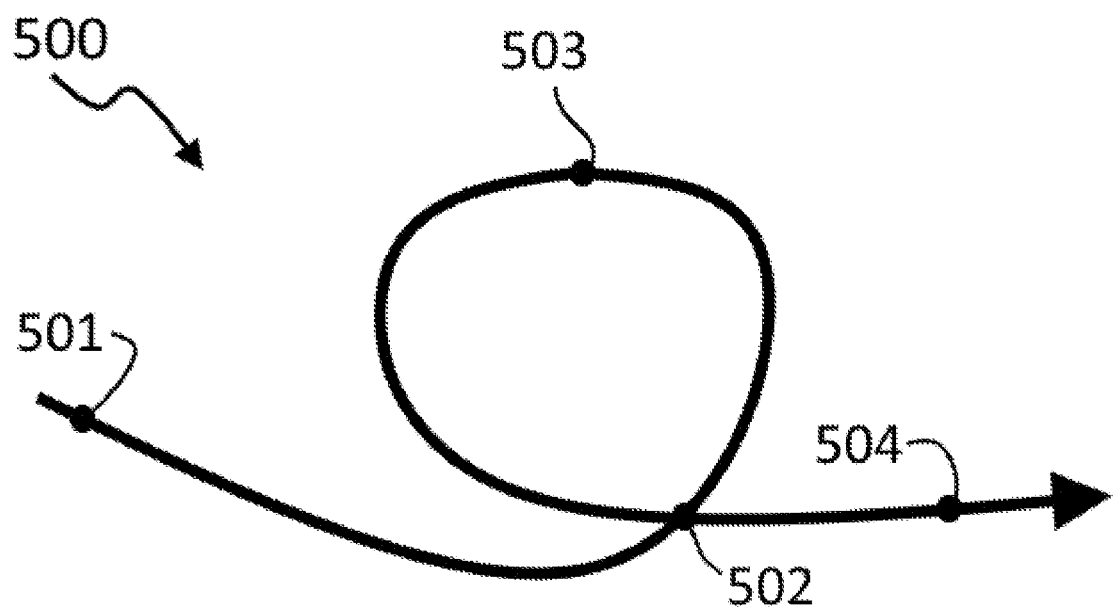
FIG. 5 is a diagram of an example walked path that includes a cross-over point.

Compiling the Paths Taken by the User into Data Structures for Sharing and Route Planning In the preferred embodiment of the invention, the user's path is recorded to memory or a file for later use in creating data structures (herein also referred to as "maps", although they aren't maps in the traditional sense, but only sets of path segments potentially also with labeled features) for retracing of path or for creating new paths between visited locations. Although it is readily conceivable that the exact, detailed paths previously followed could be used as routes, as in following breadcrumbs, there are various disadvantages to simply retracing steps. For example, FIG. 5 is a diagram of an example walked path 500 that includes a cross-over point. The user originally walks from point 501 to point 502, then around a loop including point 503, and finally on to point 504. To get back to point 501 from point 504, it would make more sense to go from point 504 to point 502 to point 501, skipping the loop, but the simplistic approach above, namely following the path exactly, but in reverse, would not detect this possibility.

Figure 6:
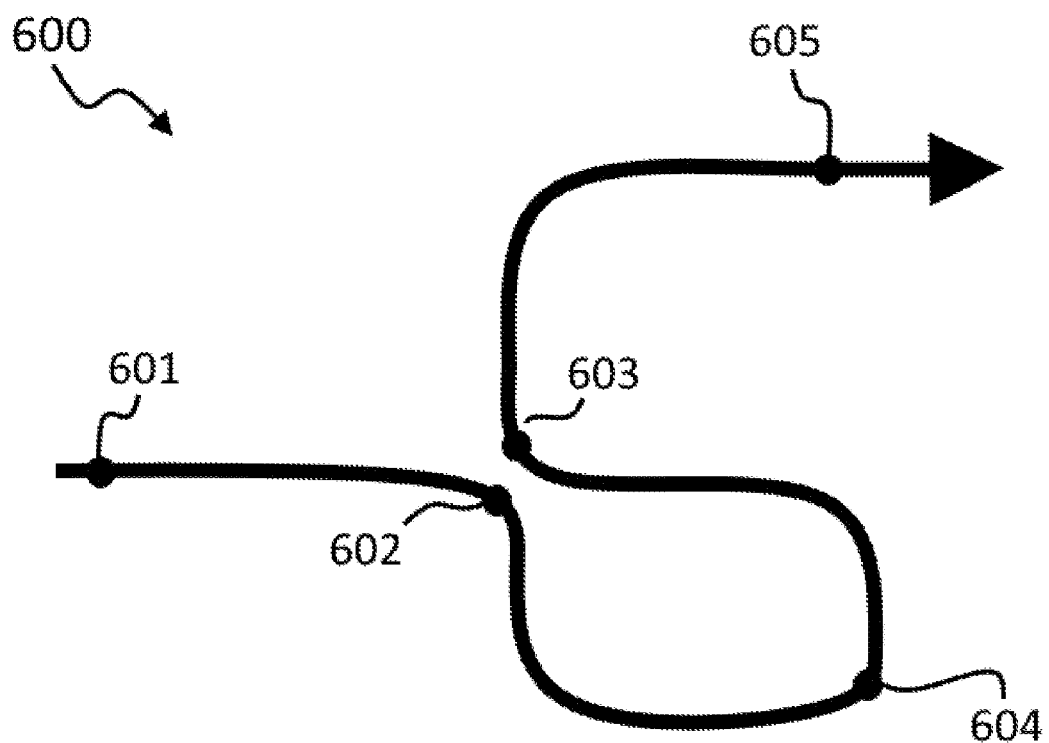
FIG. 6, which is a diagram of an example path that includes a gap.

Another shortcoming is depicted in FIG. 6, which is a diagram of an example path 600 that includes a gap. In this path, the user follows the path including points 601, 602, 604, 603, to 605. Depending on the distance between points 602 and 603, and the uncertainties of those points, it may be most likely that a more direct path following points 605, 603, 602, to 601 is possible, for example if points 602 and 603 are 2 feet apart and if their uncertainties (for example, sigma) are +/−3 feet. But to suggest this possibility, a simple route planner must be improved to be able to hypothesize connectivity between points that have not actually been previously traveled.

The preferred embodiment of the present invention creates map structures to address these types of issues. In the following, data structures called Adjacencies and Connections are defined and used for purposes of explanation, and which provide the improvements over prior art to achieve these results. However, equivalent behavior and results will be had by various re-arrangements of the specifics of the data structures within the scope of the invention, as will be apparent to one of skill in the art.

Adjacencies—

Figure 7:
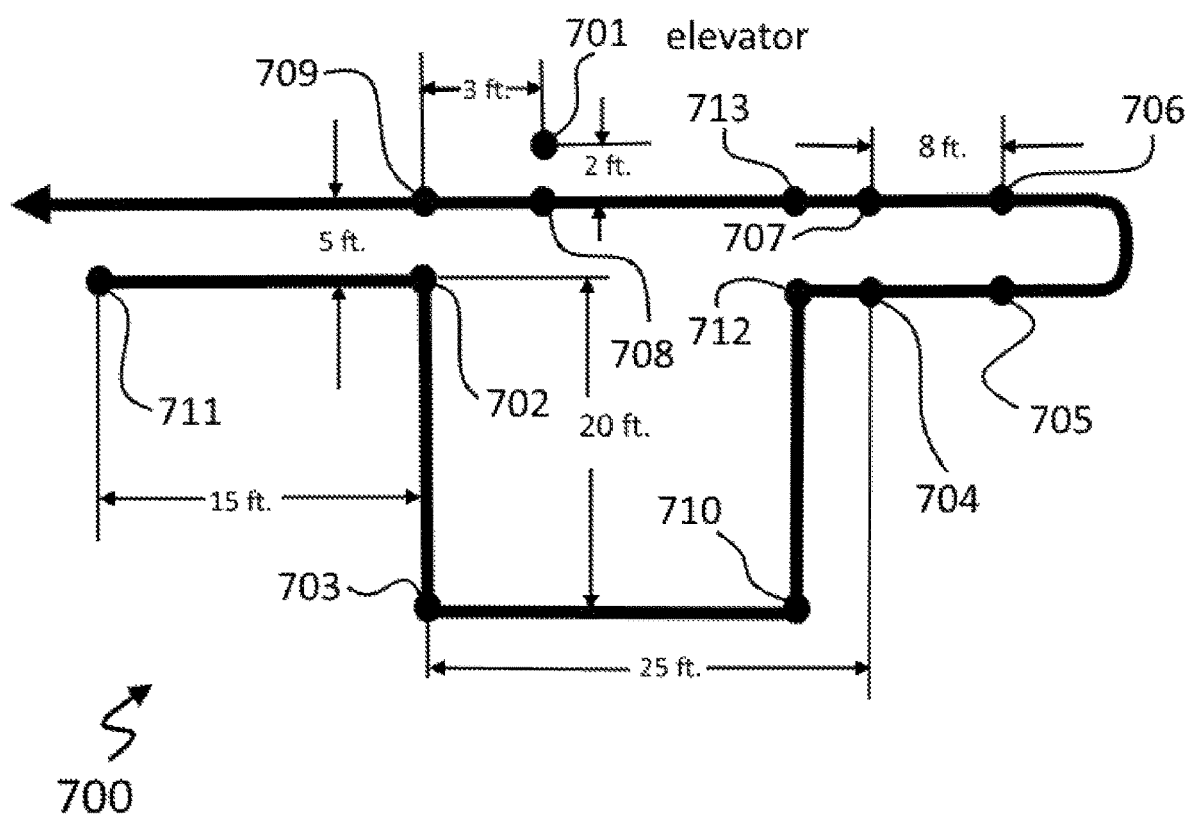
FIG. 7 is a diagram of a walked path demonstrating various features and adjacencies that are encountered and utilized by the present invention.

One data structure used by the preferred embodiment of the invention is herein called an Adjacency. An adjacency represents a point on an actual recorded path of the user that is locally closest to a feature. FIG. 7 is a diagram of a walked path 700 demonstrating various features and adjacencies. The user starts at point 711, then reaches corner feature 702, then corner feature 703, then corner feature 710, then corner feature 712, then reaches the bottom of a staircase 705, the top of a staircase 705, goes around a hairpin turn to get to the top of a staircase 706, the bottom of a staircase 707, then via point 713, walks past elevator feature 701 at point 708, then goes through point 709, toward the finish of the walked path.

To create Adjacencies, the preferred embodiment scans the path and looks for the points with positions locally closest to nearby features, preferably only those within a threshold distance, for example 10 feet. The following Adjacencies in Table 1 are examples to be found from the stored path data in FIG. 7. Note that some Adjacencies may be coincident with features, such as corner features, where the path point can be the same as the corner point.

TABLE 1

| Adjacency point on traveled path | Associated adjacent features |
| --- | --- |
| 702 | corner 702, elevator 701 |
| 703 | corner 703 |
| 712 | corner 712 |
| 704 | stairway-bottom 704, stairway-bottom 707 |
| 705 | stairway-top 705, stairway-top 706 |
| 706 | stairway-top 706, stairway-top 705 |
| 707 | stairway-bottom 707, stairway-bottom 704 |
| 708 | elevator 701 |
| 709 | corner 702 |
| 710 | corner 710 |
| 713 | corner 712 |

In the preferred embodiment, the Adjacencies are stored, instead of the entire path, and instead of retracing the entire details of the path, a path is preferably represented as a series of connections between Adjacencies.

The preferred embodiment of the present invention also creates and stores all the relevant connections between Adjacencies, in terms of a data structure referred to here as a Connection. A Connection data structure in the preferred embodiment consists of a representation of its endpoints, which are two adjacency points, the actual walked-path distance between the two points, and the gap length, or non-walked path distance between 2 points. The type of the involved Adjacencies in the non-walked path type are also preferably recorded.

For example, the Connection between points 702 and 703 is given by the following data structure in a preferred embodiment of the invention:

endpoint 1: point 702
endpoint 2: point 703
walked path length: 20 ft.
non-walked path length: 0 ft.
non-walked path type: -

As another example, the Connection between points 702 and 709 is the following data structure in this embodiment of the invention:
   endpoint 1: point 702
   endpoint 2: point 709
   walked path length: 0
   non-walked path length: 5 ft
   non-walked path type: corner/straight Optionally, the walked-path length and the non-walked path lengths are also be associated with an uncertainty, such as the sigma of its endpoints, using calculations known in the art for subtracting uncertain values. In the simplest embodiment, the Connection sigma is the sum of the sigmas of the endpoints.

In the preferred embodiment, the set of Connections is generated by traversing the entire set of known paths taken by the user. As each Adjacency is reached, a Connection is defined between the previously-encountered Adjacency and the current Adjacency. This accounts for the walked-path connections. Additionally, if the encountered Adjacency represents nearness to a feature that is not at the current position and not the previous or next Adjacency along the walked path, a Connection is defined between the Adjacency and the point of the feature that is adjacent to. For example, when reaching point 702 in FIG. 7, the preferred embodiment creates a walked-path Connection between points 711 and 702, as well as a nonwalked-path connection between points 702 and 709.

Preferably, Connections are defined between each Adjacency and all Adjacencies within a threshold distance of the Adjacency. In a preferred embodiment, the threshold distance of the Adjacency to another Adjacency is a function of the type of feature associated with the other Adjacency, corresponding to the likelihood that a yet-undiscovered connection exists between them. For example, corners in a building often occur where multiple hallways come together, so there may be connectivity down hallways that have not yet been traveled, thus making it worthwhile to define Connections between Adjacencies associated with relatively farther-apart corner features.

The representation of points and locations in Connections, Adjacencies, and paths could be 2 or 3 dimensional information, for example, in the preferred embodiment, feet North and feet East of a reference point. Alternately, GPS or Latitude/Longitude information or their equivalents could be used. Converting back and forth between these representations is well-known in the mapping art, so any of these representations could be used within the data structures of the present invention. For venues where the vertical component is important, such as multiple stories in a building, which can be identified when traversing, for example, elevator, escalator, or stairway features, a specific numerical vertical elevation can be estimated, or a symbolic or ordinal representation (for example, "higher than the level of feature 3") can optionally be specified and stored with points and paths.

Adding New Connections to Existing Connection Network—

If the user does additional traveling in the vicinity of a region where previously-stored Connections exist, or if new features are detected or added, it may be desirable to augment the existing set of Connections or Adjacencies with new ones. A preferred embodiment of the invention inserts new Adjacencies and/or Connections into the network. In addition to scanning the new path, if a new path exists, it finds nearby Connections and adds new endpoints corresponding to the new positions, which augments the additional Adjacencies and Connections made as above. The following procedure is used in the preferred embodiment to add a new feature to an existing database of Connections. Identify the closest Connection or Connections to the new feature or point.
   For each such Connection:
   If the new feature or point is within a small threshold value (for example, 3 feet), of an endpoint of the Connection, merge it with that Connection.
   Otherwise,
      identify the closest point along the line segment between the endpoints of the Connection, call this Point P.
      Delete the Connection from the database of Connections and replace it with two Connections, one from the first endpoint of the Connection to P, and one from the second endpoint of the Connection to P.
If P is within a small threshold of the new feature or point, merge those points, otherwise create a third new Connection, with gap, between P and the new feature or point.

An alternate embodiment simply inserts new Connections between nearby Connection endpoints.

Route Planning

The preferred embodiment of the present invention includes features to plan routes for a user to follow to get between points that are represented by a set of features, Adjacencies, or Connections, as defined above. In the discussion that follows, we will describe route planning in terms of Connections, although the same concepts would apply to an alternate embodiment with planning based directly on the Adjacencies, because the equivalent of Connections would be created and manipulated when processing Adjacencies. The terms "route" and "plan" may be used interchangeably to refer to the output of planning, namely, a specification of the path to be followed to reach a desired endpoint. The Connections are merely a way to pre-compile some of the information about the routes for quicker planning. An alternate embodiment of the invention would deal directly with actual paths followed by the user, thus creating and manipulating equivalent data as Adjacencies and Connections during planning.

Figure 3:
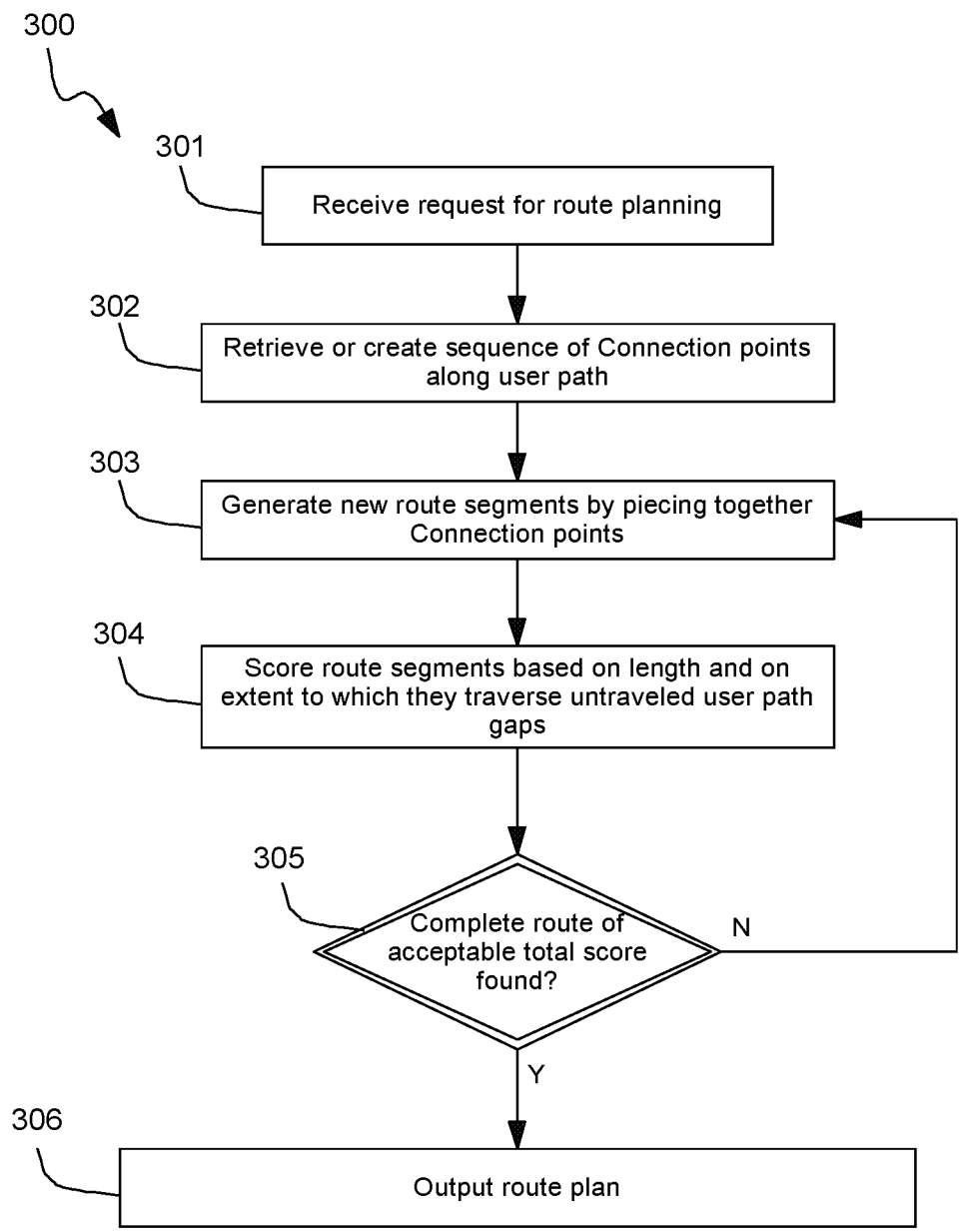
FIG. 3 is a diagram of an exemplary route planner according to the present invention.

FIG. 3 is a diagram of an exemplary route planner method 300 according to the present invention. When block 301, Receive request for route planning, initiates the planning process, the Connections along the user path are generated, or if they are pre-compiled as described above, they are retrieved from memory by block 302, Retrieve or create sequence of Connection ponts along user path. In this embodiment of the present invention, each segment, or step, of a route or plan can be envisioned as the traversal of a path between two Connections. Block 303, Generate new route segments by piecing together Connection points, performs this by iteratively adding new pairs of Connection points that ultimately may lead from the start point of the route, for example, the current position of the user, to a specified end point of the route, for example, something specified from a user interface as part of the request received by Block 301. To help decide which among possibly many alternate routes is ideal, block 304, Score route segments based on length and on extent to which they traverse user path gaps, gives a numerical or symbolic score to the route segments generated in Block 303. Block 305, Compute route of acceptable total score found?, determines whether one or more of the routes generated by block 303 achieves the requirements for getting to the end point at an acceptable score. If so, Block 306, Output route plan, provides the resultant planned route for purposes of guiding the user. This method is described in more detail below.

Search Process—

The preferred embodiment of the invention utilizes a search process to generate a route plan. Starting with one or more Connections that have one endpoint at or near the starting point for planning, for example, the user's current position, the planning process pieces Connections together, end-to-end, until a suitable plan from start to a goal connection (in other words, a Connection that has an endpoint at or near the goal endpoint) has been created.

The simplest, but perhaps most time-consuming embodiment uses an exhaustive search, for example, the following, in which the Open list contains all the partial plans currently under consideration:

1. If the user's current position (or start position from which a route is desired) does not correspond to a known endpoint of a Connection, add the point to the Connections database as described above.
2. Start with all Connections that have one endpoint at or near the start position. Put all such connections on the Open list as one-step partial plans.
3. Taking each partial plan on the Open list, find all other connections that have not yet been followed that have one endpoint that connects to the last endpoint of the partial plan. For each such connection, add that connection to the partial plan and then put the thus-augmented partial plan on the Open list.
4. If the last endpoint of the partial plan is at the desired destination, put the partial plan, now a Solution, on the Solutions list.
5. Stop whenever a Solution is found that meets the planning success criterion.

In one embodiment, the success criteria is simply that the first-found plan is sufficient. An alternate embodiment bases the success criteria on scoring each Solution and finding the best score or a sufficiently-good score, based on a scoring function that evaluates (scores) the "goodness" of each Solution.

The above paragraphs describe creating a route or plan based on a sequence of Connections. The Connections may alternately be envisioned as the endpoints of plan segments, where each segment is defined by a path or line segment between its two bounding Connections. In this view, the start of a segment has a position defined by the position associated with the first Connection of the segment, and likewise, the end of the segment has a position defined by the position associated with the second Connection of the segment. It will be clear to one of skill in the art that many other data structures encoding equivalent path and segment information could be implemented within the scope of the present invention.

Plan Scoring—

Scoring of a partial or complete planned route may be based on many different factors with in the present invention, for example, including the following options. In the preferred embodiment of the invention the overall score is a mathematical combination of subscores of the plan segments, although not necessarily a simple summation of subscores:

1. The walked-path length of the plan, found by adding the walked-path distances of all Connections in the plan.
2. The total path length of the plan, found by adding the walked-path distances and non-walked (gap) distances of all Connections in the plan.
3. A weighted sum of the walked-path and non-walked path lengths. It is typically useful to prefer using walked rather than non-walked segments. This is because a walked-path segment is certain to be passable, because it represents a section actually traversed by the user, whereas a non-walked path length is a small gap that is expected to also be passable. If a "exploration level" factor, for example, 2.0, is used as a weight for non-walked path lengths, the planning will prefer walked paths. The larger the "exploration level" setting, the less likely the plan will contain non-walked, in other words, not yet explored, paths. An adventurous navigator could then set the exploration-level value close to 1.0 to be most likely to try navigating such path segments if they contribute to a shorter overall route.
4. A weighted sum of the walked-path and non-walked path length, as above, additionally weighting the non-walked path lengths according to the type of non-walked path. For example, a non-walked path between two corner features may be more likely to be connected than that between a straight segment and a corner, so a smaller factor would be used for the corner-to-corner segments.
5. A weighted sum as above, involving a non-linear function of the nonwalked-path lengths. This is because a single length of unwalked path may be less certainly passable than a series of shorter unwalked paths of the same length. For example, a one-foot gap is almost certainly passable, so a plan that involves 10 such tiny gaps will also have a very high likelihood of being passable. However, a single 10-foot gap as a step in the plan could likely involve a wall or other structure that makes it impassable. Hence a nonlinear function such as the square or cube or other function of each non-walked path length would capture this aspect in the scoring.
6. If the walked-path and nonwalked-path lengths include uncertainties, aspects of the uncertainty in length are preferably used as part of the scoring, such as a term for the maximum and minimum-likely accumulated lengths according to the above types of scoring.

Rather than an exhaustive search process, the preferred embodiment of the present invention uses a more refined search technique, such as the well-known A* search. In this embodiment, to score a partial plan, an estimate of the score of the remaining path to the goal, in addition to the path in the partial plan from the start point, is used as the score. A simple "admissible" estimate is the straight-line path from the endpoint of the partial path to the goal. In this embodiment of the invention, the partial plan with the best score is expanded at each step in the process described above, rather than an exhaustive expansion of all partial plans. Because it is an "admissible" search technique, the first Solution that is found is guaranteed to be the best.

As an example, in FIG. 3, if a plan is desired from point 311 to point 306, an optimal plan might be, if the scoring function is the sum of walked path lengths and 2 times the sum of the squares of nonwalked-path length:

1. The connection between 311 and 302, total score=15
2. The connection between 302 and 309, total score=15+ 2*5*5
3. The connection between 309 and 307, total score=15+ 2*5*5+25
4. The connection between 307 and 306, total score=15+ 2*5*5+25+8

Simplifying Route Details

To convert a plan into a form that is useful and practical for people, some simplification of the planned route may be needed. For example, in FIG. 3, consider the following plan:
1. The connection between 311 and 302 (15 feet long)
2. The connection between 302 and 301 (7.6 feet long)
3. The connection between 301 and 308 (2 feet long)
4. The connection between 308 and 307 (22 feet long)

The 2-foot long step may be confusing, as it would seem the person has to walk to the elevator, then turn almost completely around to get back to the path. The 7.6 foot step might also be extraneous for some users. It could be that the most comprehensible path is simply to ignore the "jog" in the path near the elevator and specify a straight path to the destination:
1. A connection between 311 and 307

Some of the reasons that simplification may be needed include:
 (a) a plan step is too short to be significant
 (b) the change in direction between plan steps is not significant In the preferred embodiment of the present invention, plan steps are analyzed against a set of criteria and the steps are combined as needed to eliminate such issues.

In one embodiment, adjacent Connections (also referred to here as steps) in the planned route are combined if one or more of the following conditions are true, iteratively combining steps until no more can be combined:
 (a) The angle difference between the steps is smaller than a threshold.
 (b) The length of one of the steps is smaller than a significant-length threshold.

One issue that may occur with this algorithm, however, is that the direction of the augmented step may "creep" if several smaller steps are successively added to it. In one embodiment, this issue is addressed by keeping track of the original angle of plan steps that are long enough to be more than a significant-length threshold, for example, 10 feet. Before one of these steps is combined with others, or if a step resulting from combining it with others is to be combined with yet another step, it is first verified that the resulting angle of the combined steps is not more than a threshold angular difference as compared to the original angle of any of its significantly-long components. If the combination of steps (augmentation) would cause such a disparity, the combination is not made.

In the preferred embodiment, the original angle of the significantly-long steps is kept track of. If the addition of a plan step would cause the end point of the combined steps to be more than a threshold distance from the line extending through the original significantly-long plan step, the combination is not made. This takes care of a case where a turn, of say 10 feet, which represents a significant navigation move, happens after a very long step, say 100 feet. The resulting angular difference between the original and augmented steps is small, but it still should not be combined, because the significance of the 10-foot excursion would otherwise be lost.

In another embodiment of the present invention, simplification occurs only to the extent of creating the first one or two steps of the output plan, because that is all that is typically communicated to the user at any time. This allows new plans to be generated during navigation, in case the user deviates from the plan and a new plan could provide a more-optimal route than following the original route.

Giving Navigation Instructions in the Context of Uncertainty

Although various systems and methods exist in the art for giving navigation instructions to users, the existing art typically can assume that the map is relatively accurate and complete, and that the uncertainties are primarily with regard to the position of the user. With indoor, inertially-based, and indoor sensors, however, there may be just as much, or even more, uncertainty in the positional uncertainty of entities on the map (i.e., in the Connection endpoint positions) as there is in the position of the user. Additionally, since the map is based only one where a user has been, and often not on any definitive information about the venue, it is typically the case that there are more possible paths than the ones represented in the map, such that the map may be far from complete. These issues present several interesting additional issues for providing good route-following instructions to the user. Some of the issues that can occur, and for which an improvement in the state of the art is needed, include:
 (a) Not sure if user is actually on the path. In addition to the uncertainties in both path points and user position, the user could actually be on a nearby, for example, parallel path.
 (b) Not sure if user has really reached a feature in the route or not.
 (c) Not sure if the user can reach the next step in the plan without appearing to navigate the apparent end of the current plan step. In other words, there may be additional ways to get to a successive plan step than to pass through the endpoint of the current plan step.
 (d) Not sure if a feature is in front or behind the user. It can be very confusing if the system thinks the user has passed a point when it is still ahead of the user.
 (e) Not sure if the correct turn has been made in the right place. Even if it is clear the user has made a turn, and the map shows no alternatives, there is no guarantee that there isn't a nearby alternative place at which to turn and the user may have taken it.
 (f) There might not actually be connectivity when the map suggests there is. Due to the non-walked (gap) sections in the map, although likelihoods are used, it is possible there is a wall or other obstacle that prevents the route from being followed as-is. The instructions should not try to force the user to follow the exact plan steps in case there is no connectivity, especially if the user is on a trajectory that may be suggestive of leading to the next plan step.

Techniques to Address Uncertainties in Navigation Instructions—

Initially, it is relatively straightforward to generate directions, given the user's position and a planned route that starts at the user's current position. For example, the preferred embodiment simply instructs the user to proceed along the first Connection (step) of the plan, for example: "Go slightly to the right for 25 feet." Instead of giving a numerical angle, the angular space can be divided into symbolic regions, for example, "slightly to the right", as exemplified by Table 2, although other constants could readily be used in other embodiments of the present invention:

TABLE 2

| Angle range (degrees) | Symbolic description |
| --- | --- |
| −180 through −157.5 | turn around |
| −157.5 through −112.5 | behind and left |

TABLE 2-continued

| Angle range (degrees) | Symbolic description |
| --- | --- |
| −112.5 through −67.5 | to the left |
| −67.5 through −22.5 | slightly to the left |
| −22.5 through 22.5 | straight ahead |
| 22.5 through 67.5 | slightly to the right |
| 67.5 through 112.5 | to the right |
| 112.5 through 157.5 | behind and right |
| 157.5 through 180 | turn around |

After the initial instructions, as the user proceeds, however, logic is needed to determine when to give additional directions to the user. A simple embodiment would just continue to guide the user with instructions as to the direction of the end of the segment, proceed to the next segment, and continue. However, the various issues identified above will undoubtedly arise, and require improvements over the simplistic approach to avoid user confusion.

Figure 8:
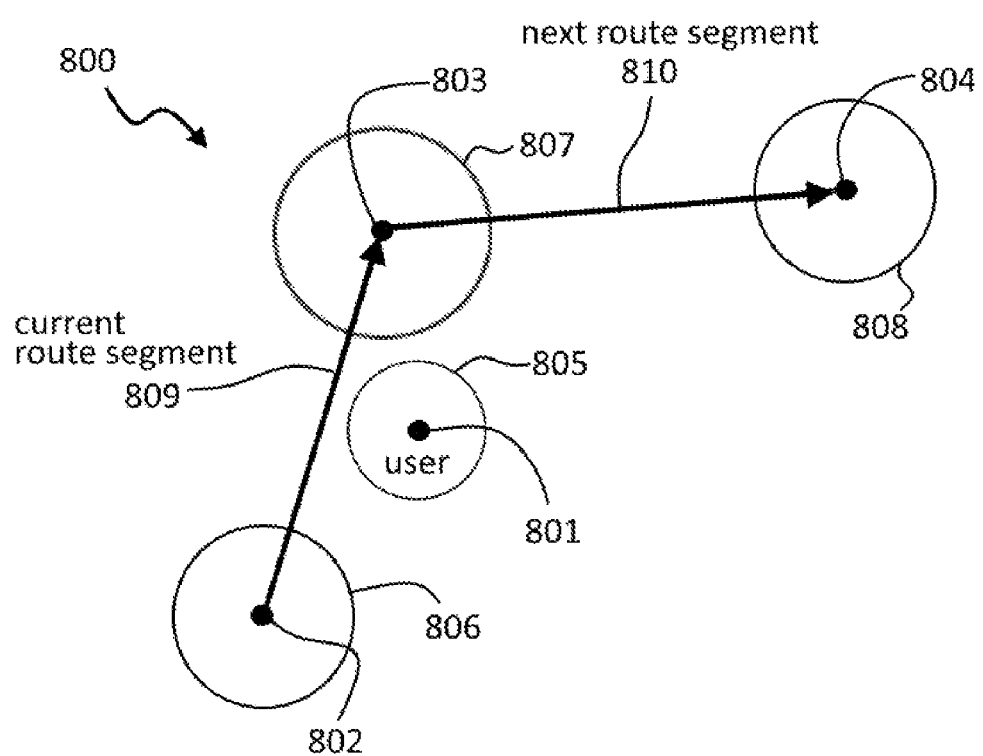
FIG. 8 is a diagram showing a partial planned route according to the present invention that includes two plan segments.

FIG. 8 is a diagram showing a partial planned route 800 according to the present invention that includes two plan segments, current route segment 809 and next route segment 810. Route segment 809 has start point 802 with an associated uncertainty represented by circle 806 whose radius is of the sigma of the position of start point 802. Route segment 809 has end point 803 with an associated uncertainty represented by circle 807 whose radius is of the sigma of the position of start point 803. End point 803 also corresponds to the start point of next route segment 810, and next route segment 810 has end point 804 with an associated uncertainty represented by circle 808 whose radius is of the sigma of the position of end point 808. The position of the user 801 likewise has an associated uncertainty represented by circle 805 whose radius is of the sigma of the position of the user 801. The following paragraphs explain preferred embodiments for how the present invention guides user from point 801 along current route segment 809 and/or next route segment 810, taking into account the various uncertainties.

In a preferred embodiment, a series of rules is evaluated to determine what, if any, changes in direction to give to the user. A technique in the preferred embodiment is to define a set of Boolean state variables that indicate aspects of the state of navigation of the current plan segment. Other equivalent logical constructs could readily be used, but the following list of variables illustrates by example various aspects of the logical process. The state variables, which can also be viewed as qualitative or symbolic position variables, include: whether the user is in the vicinity of the end of the current plan segment/step, whether the user is in the vicinity of the plan destination, whether the user appears to have passed the end of the current plan segment, whether the user is possibly on or near the next segment in the plan, whether the user may be headed toward meeting the next plan segment, and/or whether the heading of the user is consistent with the current plan segment or whether the heading of the user is consistent with the next plan segment. Each Connection corresponds to a plan or route segment. Specific detailed examples of potential state variables in one embodiment of the invention include:

withinRangeDestination: true if the distance from the current position to the endpoint is less than threshold WithinRangeDestination.

nearingTheTurn: true if the distance to the endpoint of the current Connection is less than a threshold maxWithinRangeDistance.

haveNearedTheTurn: true if the user has been near the turn (nearingTheTurn has been true) during this navigation step withinRangeOfTurn: true if the distance to the endpoint is less than an alwaysWithinRangeDistance threshold.

skippedTheTurn: true if the turn at the end of this Connection has an angle difference greater than a threshold and the path of the user has crossed a line following the next step in the plan, expanded to a region that includes the uncertainty of the next step, or if the distance to the endpoint is greater than a nearbyLocationThreshold and the distance to the next Connection is less than a nearbyLocationThreshold.

offCourse: true if the heading of the user deviates from the angle to the endpoint by more than a threshold and the distance from the Connection is greater than a threshold.

passingFarSide: true if the user position could be beyond a line through the endpoint and perpendicular to the current Connection to the current position.

haveGivenInitialNavInstructions: true if the system has given the user instructions toward the endpoint of the current Connection.

updatedUserDirection: an angle indicating the current direction from the user's orientation to the endpoint of the current Connection.

latestUserDirection: the latest angular instruction (for example, straight-ahead, to-the-left) given to the user.

The distance thresholds depend on the navigation specifics, but for example, could be in the range of 2 feet to 10 feet, and angle thresholds for approximating straight lines are in the range of 5 degrees to 20 degrees, and those for turns are in the range of 50 to 130 degrees. The calculation of these variables is performed by envisioning the points and line segments as surrounded by circles or rectangles with dimensions reflecting the uncertainty values associated with those points, as will be apparent to one of skill in the art. For example, a simple implementation would make these shapes correspond to the sigma value associated with the respective positions.

In the preferred embodiment, these or similar navigation state variables are combined into instructions to give to the user. In the preferred embodiment, examples of possible decisions on what navigation instructions to give include:

(a) say nothing now, the user is proceeding acceptably along the planned route, (b) indicate the user has reached the destination of the route, (c) give a complete description of the navigation to the endpoint of the current Connection, (d) guide the user toward the endpoint of the current Connection, (e) guide the user toward the endpoint of the next Connection, or (f) re-plan a route to the final destination Within the scope of the present invention, there are various ways to combine the navigation state variables to generate navigation instructions. In a preferred embodiment, each of the boolean variables as a includes an if/then/else structure to decide which is the correct navigation instruction to give. Within the scope of the invention, the set of variables and/or the set of possible navigation instructions could be expanded, reduced, or combined. For example, the "give the user a complete description of the navigation to the endpoint of the current Connection" could be the same action as "guide the user toward the endpoint of the current Connection", though preferably, the latter would be more succinct, such as "more to the left", instead of the original "go 35 feet to the left".

Below is one example of an embodiment, in pseudocode form, of a logical if/then/else tree for generating the decision on which navigation instruction to give according to the present invention. The use of these variables constitutes an advantage over prior art in that it accounts for many potential ambiguities of the exact position of the user with respect to the positions of the plan segment being navigated. The variances in each Connection are taken into account, rather than assuming an exact, point-like destination with respect to the current position of the user. It will be clear to those with skill in the art that other combinations of the variables could readily be used to refine exactly how the instructions are given:

```
if (withinRangeDestination){
    navinstruction=indicate the user has reached the destination of the route
} else if (nearingTheTurn && !withinRangeOfTurn && !haveNearedTheTurn){
    haveNearedTheTurn=true;
    if (!haveGivenInitialNavInstructions){
        navinstruction=give a complete description of the navigation to the endpoint of the current Connection,
        haveGivenInitialNavInstructions=true;
    } else {
        navinstruction=guide the user toward the endpoint of the current Connection,
    }
} else if ((skippedTheTurn passingFarSide withinRangeOfTurn) && beenWithinRangeOfTurn){
    if (passingFarSide && nextPlanStep!=null){
        navinstruction=guide the user toward the endpoint of the next Connection
    } else if (nextPlanStep==null){
        navinstruction=indicate the user has reached the destination of the route
    } else {
        navinstruction=guide the user toward the endpoint of the next Connection
    }
    beenWithinRangeOfTurn=true;
    if (nextPlanStep==null) {
        navinstruction=indicate the user has reached the destination of the route
    }
} else if (!haveNearedTheTurn && !haveGivenInitialNavInstructions){
    navinstruction=give a complete description of the navigation to the endpoint of the current Connection,
    haveGivenInitialNavInstructions=true;
} else if (haveGivenInitialNavInstructions && offCourse)
{
    navinstruction=replan a route to the final destination
} else if (latestUserDirection !=updatedUserDirection){
    navinstruction=guide the user toward the endpoint of the current Connection
} else {
    navinstruction=say nothing more, the user is proceeding acceptably along the plan,
}
```

In another preferred embodiment of the present invention, a series of state variables is given a numerical rating based on the likelihood of being true, which is based on the uncertainty mathematics described above, in terms of variance and sigma. Each state variable implies that a particular direction should be followed by the user. The implied direction with the highest total likelihood is selected as the one to present to the user.

Figure 4:
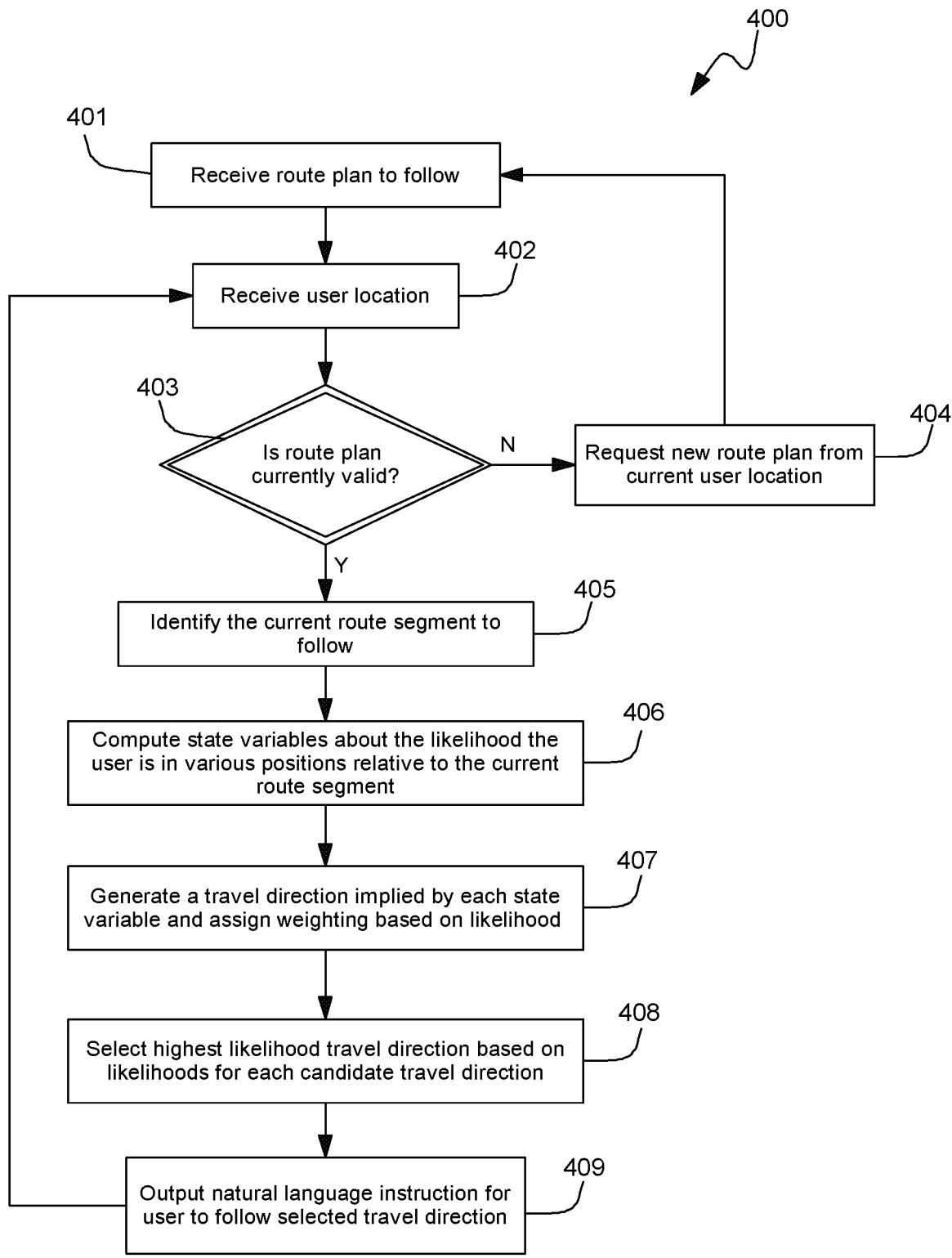
FIG. 4 is a diagram depicting an exemplary method for guiding the user according to one embodiment of the present invention.

FIG. 4 is a diagram depicting an exemplary method for guiding the user 400 according to the above embodiment. Upon starting the process in block 401, Receive route plan to follow, block 402, Receive user location, obtains the latest estimate of user position, for example, current position estimate 106. By comparing this estimate to the route segments, block 403, Is route plan currently valid?, may cause control to flow to Block 404, Request new route plan from current user location, to obtain a new route to replace the current invalid route. Otherwise, block 405, Identify the current route segment to follow, considers the uncertainties of the start and end positions of the route segments to make sure the correct segment is currently being used. Block 406, Compute state variables about the likelihood the user is in various positions relative to the current route segment, does the implied calculations to see if the position and orientation of the user are consistent with following the segment, reaching the endpoint of the segment, or already being at the next segment, as will be described in more detail below. Block 407, Generate a travel direction implied by each state variable and assign weighting based on likelihood, generates some alternate directional instructions to be given to the user, based on the various possible locations, due to uncertainty, where the user can be, then block 408, Select highest likelihood travel direction based on likelihoods for each candidate travel direction, chooses the highest likelihood of the possibilities that are subsequently output to the user as text, voice, graphics, etc. in block 409, Output natural language instruction for user to follow selected travel direction.

TABLE 3

| State variable | Implied direction of travel |
|---|---|
| User within threshold of current route segment | endpoint of current route segment |
| User has passed endpoint | endpoint of next route segment |
| User greater than threshold from current route segment and next route segment | direction of new plan |
| User is not past endpoint and not within threshold of route segment | endpoint of current route segment |
| User is closer to next route segment than current route segment | endpoint of next route segment |
| User headed away from endpoint subsequent gap in current plan | direction of new plan that avoids |
| Within threshold of endpoint of final plan segment | none- user has reached destination |

The threshold values in Table 3 may be any reasonable value relative to the uncertainties in the system, for example in the range of 10 to 20 feet. It will be apparent to one of skill in the art that additional state variables can readily be defined within the scope of the invention to help guide the user toward an appropriate direction, for example, variables that define being at certain fractions of the length of a plan segment, or the user facing toward or away from other points in plan segments, as long as it is possible to calculate a likelihood of the state variable being true so that it can be combined to create an instruction for the user.

Various mathematical techniques can be used to calculate likelihood values for each of the state variables. In one embodiment of the present invention, a Gaussian distribution representing the position of the positions of the user and the start and end points of plan segments are used, and an integral is computed for each state variable along the relevant areas of space, as will be apparent to those of skill in the art. A preferred embodiment of the present invention instead uses a Monte-Carlo style simulation, in which various points selected around the center value for each of these position is used, and the fraction of simulations for which the variable is true is used as the likelihood value. Other approximations will be apparent to one of skill in the art for deriving an approximate likelihood for such state variables on the basis of user location, route segment start point and route segment end point, each with an associated uncertainty sigma.

When a likelihood for each state variable is computed, each implied direction, preferable selected from the set of directions of Table 2, is associated with a net likelihood score, and the best is used to give instructions. One simplification of the likelihood calculation is to sum all likelihoods for each of the potential (candidate) directions, and choose the direction with the highest sum.

Predicting the User's Future Position—

If there are delays in the sensor or processing system, there may be a time delay between the user's actual position and the user's position that is available to the system for giving directions. If this delay is too large, the user may walk past turns in the plan, or the directions may be obsolete by the time the user receives them. To avoid this, the preferred embodiment of the present invention projects the likely position of the user based on the latest known positions. The projected position is then used in generating directions, so that they will be given at the appropriate time.

Various function-prediction techniques known in the art are used in embodiments of the invention. One embodiment uses a weighted average of two or more recent path points to derive a speed and direction of the user's motion. The speed values are optionally further filtered by a low-pass filter to get a smoothed speed value. Then the predicted position is formed by projecting the latest direction of the user (also optionally low-pass filtered) according to the speed multiplied by the delay time that is being compensated for. For example, if the filtered speed is 2 feet per second and the user's latest heading is 30 degrees from North, the future position, assuming a 1.5 second delay would be 3 feet from the latest measured position, at an angle of 30 degrees from that position. A safety factor is optionally added, to prevent wayward predictions. For example, a constant safety factor of 0.5 would limit the projected distance to one-half that predicted. Alternately, a maximum distance constant, for example 8 feet, is implemented to prevent projections from being more than 8 feet from the known position.

Storing and Sharing Maps of Venues

Although the invention as described above can be very useful for an individual to navigate in areas where he/she has previously been, the utility of the invention can be increased by storing the information from numerous venues for later recall. In a preferred embodiment of the invention, the Connection information as described above is stored, rather than all the details of the path within each connection. The positions of the coordinates are referenced to a reference point in a venue, such as a front door. Alternately, the coordinates are referenced to latitude/longitude or GPS or equivalent coordinates, for example, exact coordinates manually entered by a user, or by GPS readings obtained electronically by the system if it has a GPS interface. In one example embodiment, the GPS coordinates of the front entrance to a building are recorded, and even if GPS is not available within a building, the system references all the user's motions to that last known GPS location.

Along with the Connection information as shown above, preferably relevant features among the Connections are labeled with a useful label. For example, in a doctor's office, labels such as "front door", "receptionist's desk", and "door to Dr. Smith's office", "on the second floor" could be typical. In one embodiment, these labels are defined by typing or speech entry by the user when they are at the location, or entered later by an interface that depicts where the user has been. These labels are then preferably stored with the Connection information.

Alternately, instead of storing the Connection structures described above, the Adjacency information, or even the original path taken by users are stored, and the above data structures generated on as as-needed basis. It will be apparent to one of skill in the art that many variations of the detail and type of data storage and retrieval are possible to yield equivalent or similar navigation behavior within the scope of the present invention.

The venue information (Adjacencies, Connections, etc.) are preferably stored in a database that is indexed by venue name, GPS coordinates, or other useful means of accessing where the user is.

The utility of the invention is enhanced in a preferred embodiment of the present invention by sharing of venue information between users, and by combining the venue information from multiple visits or users. In the preferred embodiment, the venue information is stored in a database that is made available to users for free or by subscription. Alternately, a crowd-sourced architecture is used, where users contribute their map information to the database. In one embodiment, users manually score the goodness of maps after using them and/or allow only maps of a minimum score to be used. Alternately, the system automatically scores maps by how well and/or how often the user reaches the requested destination, for example, by detecting if the user's path actually follows the selected plan, and/or if the user finds a plan to use after accessing the map.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A computer-implemented method for providing navigation assistance to a user, the method being implemented by a computer that includes a physical processor, the method comprising
    (a) obtaining a position information about the location of the user from a position sensor,
    (b) based on the position information, calculating an estimate of the position of the user, calculating an uncertainty of the position of the user, and calculating an estimate of the heading of the user,
    (c) creating a path of the user by generating a series of position points corresponding to the position information,
    (d) generating a plurality of features of interest by detecting characteristic patterns in the position information and/or in the path of the user, and for each feature of interest of the plurality of features of interest, associating a position, an uncertainty, and a feature type,
    (e) computing an apparent distance between a selected feature of the plurality of features of interest and a previously-stored feature of the plurality of features of interest, by comparing the position associated with the selected feature and the position associated with the previously-stored feature,
    (f) computing an equivalence likelihood that indicates the extent to which the selected feature is likely to correspond to the previously-stored feature based on
        (1) the likelihood of multiple features of the type of the selected feature occurring within the apparent distance,
        (2) the uncertainty associated with the selected feature,
        (3) the uncertainty associated with the previously-stored feature, and
    (g) based on the equivalence likelihood, updating at least one of the position associated with the selected feature, the position associated with the previously-stored feature, and the estimate of the position of the user.

2. The method of claim 1, wherein the obtaining a position information about the location of the user from a position sensor comprises obtaining data from one or more of an accelerometer, an angular rate sensor, a magnetic field sensor, a global positioning system sensor, and a radio-frequency transmitter sensor.

3. The method of claim 1, wherein the calculating an uncertainty of the position of the user comprises multiplying a constant error coefficient by an estimate of the distance traveled, as calculated from the path of the user.

4. The method of claim 1, wherein the detecting characteristic patterns in the position information and/or in the path of the user comprises at least one of detecting turns in the path of the user representing corners, detecting sections of travel in the path of the user representing straightaways, detecting vertical accelerations indicative of elevators, and detecting patterns of horizontal and vertical accelerations indicative of stairways.

5. The method of claim 1, wherein the selected feature is a straightaway feature, and wherein the previously-detected feature is a second straightaway feature and wherein the updating the position associated with the selected feature comprises updating the position of a plurality of position points associated with the straightaway feature to cause the angle of the straightaway feature to be more nearly equal to the angle of the second straightaway feature.

6. The method of claim 1,
    wherein the obtaining a position information about the location of the user from a position sensor comprises obtaining data from a radio-frequency transmitter sensor and wherein the selected feature is a radio-frequency transmitter feature,
    and wherein the updating the estimated position of the user comprises computing a ring-shaped area corresponding to the signal strength associated with the data from the radio-frequency sensor signal over a plurality of position points in the path of the user,
    further comprising adjusting the estimated position of the user to be closer to the center of the ring-shaped area.

7. The method of claim 1, wherein the computer is a device selected from the group consisting of a personal computer, a smart phone, a smart tablet, a smart watch, and smart glasses.

8. The method of claim 1, further comprising
    (a) generating a sequence of adjacencies by identifying a sequence of position points along the path of the user that are locally nearest to one of the features of the plurality of features of interest,
    (b) generating a plurality of plan segments, comprising selecting plan segment start positions from the sequence of adjacencies and selecting plan segment end positions from the sequence of adjacencies,
    (c) generating a connection score for each plan segment in the plurality of plan segments by receiving an exploration-level coefficient, computing a subscore for the plan segment based on the distance between the start position of the plan segment and the end position of the plan segment, and further increasing the subscore in response to the exploration-level coefficient if the start position of the plan segment and the end position of the plan segment are not associated with neighboring adjacencies in the sequence of adjacencies,
    (d) saving the sequence of adjacencies to a database, whereby navigation information about the path of the user can be saved for later use by the user or other people.

9. The method of claim 1, further comprising planning a route, wherein the planning a route comprises
    (a) receiving a plurality of plan segments, each plan segment comprising a start position, a start position uncertainty, an end position, an end position uncertainty, and a score,
    (c) creating a plurality of plans, comprising generating a plurality of sequences of plan segments selected from the plurality of plan segments,
    (d) selecting a plan to score from the plurality of plans,
    (e) associating a score with the plan to score, comprising combining the scores associated with the plan connections in the sequence of plan connections,
    (f) specifying a plan to follow by selecting the plan that has the lowest associated score from the plans of the plurality of plans.

10. The method of claim 9, wherein the receiving a plurality of plan segments comprises
    (a) generating a sequence of adjacencies by identifying a sequence of position points along the path of the user that are locally nearest to one of the features of the plurality of features of interest,
    (b) generating a plurality of plan segments, comprising selecting plan segment start positions from the sequence of adjacencies and selecting plan segment end positions from the sequence of adjacencies,
    (c) generating a connection score for each plan segment in the plurality of plan segments by receiving an exploration-level coefficient, computing a subscore for the plan segment based on the distance between the start position of the plan segment and the end position of the plan segment, and further increasing the subscore in response to the exploration-level coefficient if the start position of the plan segment and the end position of the plan segment are not associated with neighboring adjacencies in the sequence of adjacencies.

11. The method of claim 9, wherein the receiving a plurality of plan segments comprises loading the plurality of plan segments from a database, whereby information about previous visits to a location is retrieved and made available for the user for navigating unfamiliar areas.

12. The method of claim 9, further comprising
(a) receiving a plan segment associated with the plan to follow and a subsequent plan segment associated with the plan to follow,
(b) creating a symbolic description of the relative position of the user with respect to the plan segment as a set of values of binary state variables, the set of values computed by computing geometrical shapes representing uncertainty and associated with one or more of the position of the user, the position of the start position of the plan segment, the line segment between the start position of the plan segment and the end position of the plan segment, the end position of the plan segment, and the line segment between the start position of the subsequent plan segment and the end position of the subsequent plan segment, wherein the binary state variables approximate at least
  (1) whether the user is in the vicinity of the end position of the plan segment,
  (2) whether the user appears has passed beyond the end position of the plan segment,
  (3) whether the user is on or near the subsequent plan segment,
(c) evaluating a logical expression involving the state variables and outputting a requested direction of travel, and
(d) generating a natural-language text instructing the user to turn and/or move in a specific direction on the basis of the requested direction of travel.

13. The method of claim 9, further comprising
(a) receiving a plan segment associated with the plan to follow and a subsequent plan segment associated with the plan to follow,
(b) associating a likelihood score with each of a plurality of likelihood variables based on one or more of the uncertainty of the estimated position of the user, the uncertainty associated with the start point of the plan segment, and the uncertainty associated with the end point of the plan segment, each likelihood variable describing a likelihood that the user is in a certain position relative to the plan segment and/or the subsequent plan segment, the likelihood variables comprising variables that measure at least
  (1) the likelihood the user is within a threshold distance of the plan segment,
  (2) the likelihood the user is within a second threshold distance of the end position of the plan segment, and
  (3) the likelihood the user is closer to the subsequent plan segment than to the plan segment,
(c) for each of the plurality of likelihood variables, associating a likelihood score and a requested direction of travel,
(d) determining a travel direction by considering the likelihood scores and requested directions of travel associated with the plurality of likelihood variables, and
(e) generating a natural-language text instructing the user to turn and/or move in a specific direction on the basis of the travel direction.

14. A system for providing navigation assistance to a user, comprising a position sensor configured to output a position information about the location of the user, the position information comprising a position estimate, the system further comprising a processor and a memory device, the memory device storing program code that when executed by the processor, causes the processor to perform operations, wherein the program code comprises:
  (a) a path recorder program code configured for receiving the position information from the position sensor, and based on the position information, for outputting an estimate of the position of the user, for outputting an uncertainty of the position of the user, for outputting an estimate of the heading of the user, and for incorporating the position information into a path of the user,
  (b) a feature detector program code configured for generating a plurality of features of interest based on detecting characteristic patterns in the position information and/or in the path of the user, and for a feature of interest of the plurality of features of interest, for associating a feature type with the feature of interest, for associating a feature position with the feature of interest, and for associating an uncertainty with the feature of interest,
  (c) a Likelihood Estimator program code configured for computing an apparent distance between a selected feature of the plurality of features of interest and a previously-stored feature of the plurality of features of interest, based on the feature position associated with the selected feature and the feature position associated with the previously-stored feature,
  and further configured for computing an equivalence likelihood indicating the extent to which the selected feature is likely to correspond to the previously-stored feature, based on
    (1) the likelihood of multiple features of the type of the selected feature occurring within the apparent distance,
    (2) the uncertainty associated with the selected feature,
    (3) the uncertainty associated with the previously-stored feature, and
  (d) a Position updater program code configured for receiving the equivalence likelihood and based on the equivalence likelihood, for updating the feature position associated with the selected feature and/or the feature position associated with the previously-stored feature and/or the estimate of the position of the user.

15. The system-of claim 14, wherein the program code further comprises a route planner program code, wherein the route planner program code comprises
  (a) an adjacency detector program code configured for outputting a sequence of adjacencies corresponding to a plurality of positions along the path of the user that are locally nearest to a feature from the plurality of features of interest,
  (b) a plan builder program code configured for creating a plurality of plans, each of the plurality of plans comprising a sequence of plan segments, each of the plan segments comprising a start position corresponding to an adjacency of the sequence of adjacencies and an end position corresponding to a second adjacency of the sequence of adjacencies,
  (c) a plan scorer program code configured for receiving an exploration-level coefficient and for computing a score for a plan of the plurality of plans based on computing a subscore for a plan segment of the sequence of plan segments of the plan based on the distance between the start position of the plan segment and the end position of the plan segment, wherein the score is further increased in response to the exploration-level coefficient if the start position of the plan segment and the end position of the plan segment are not associated with neighboring adjacencies in the sequence of adjacencies, whereby a plan that traverses between adjacencies that are not neighboring in the path of the user are considered, but are associated with a higher score, (d) a plan selector program code configured for choosing a selected plan of the plurality of plans based on the score of the selected plan being lower than the score of a second plan of the plurality of plans, (e) a plan explainer program code configured for generating natural-language information about the selected plan and to output the natural-language information to the user.

16. The system of claim 15, wherein the plan explainer program code is configured for receiving a plan segment of the selected plan and a subsequent plan segment of the selected plan and comprises (a) a qualitative position calculation program code configured for creating a symbolic description of the relative position of the user with respect to the plan segment as a set of values of state variables, the state variables based on at least the uncertainty of the position of the user, the uncertainty of the start position of the plan segment, and the uncertainty of the end position of the plan segment, wherein the state variables comprises variables that measure
  (1) whether the user is in the vicinity of the end position of the plan segment,
  (2) whether the estimate of the heading of the user is consistent with the plan segment,
  (3) whether the user has passed beyond the end position of the plan segment, and
  (4) whether the user is on or near the subsequent plan segment, (b) a direction determination program code configured for evaluating a logical expression involving the state variables and for outputting a description of a direction of travel, and (c) a natural language generation program code configured for receiving the description of a direction of travel and for generating a natural-language text instructing the user to turn and/or move in a specific direction on the basis of the description of a direction of travel.

17. The system of claim 15, wherein the plan explainer program code is configured for receiving a plan segment of the selected plan and a subsequent plan segment of the selected plan and comprises:

(a) a plurality of location variables, each location variable of the plurality of location variables describing a likelihood that the user is in a certain position relative to the plan segment and/or the subsequent plan segment, wherein the plurality of location variables comprises location variables describing
  (1) the likelihood the user is within a threshold of the plan segment,
  (2) the likelihood the user is within a second threshold of the end position of the plan segment, and
  (3) the likelihood the user is closer to the subsequent plan segment than to the plan segment, (b) a likelihood calculation program code configured for associating a likelihood score to a variable of the plurality of location variables and for outputting an associated direction of travel on the basis of at least one of the estimate of the position of the user, the uncertainty of the position of the user, the uncertainty of the start position of the plan segment, the uncertainty of the end position of the plan segment, and the uncertainty of the end position of the subsequent plan segment, (c) a direction determination program code configured for outputting a selected direction of travel based on the likelihood score and the associated direction of travel, and (d) a natural language generation program code configured for generating a natural-language text instructing the user to turn and/or move in a specific direction on the basis of the selected direction of travel.

* * * * *